United States Patent
Louh

(10) Patent No.: US 8,804,242 B2
(45) Date of Patent: Aug. 12, 2014

(54) POLARIZER AND FABRICATION METHOD THEREOF

(71) Applicant: Hon Hai Precision Industry Co., Ltd., New Taipei (TW)

(72) Inventor: Sei-Ping Louh, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/164,125

(22) Filed: Jan. 24, 2014

(65) Prior Publication Data

US 2014/0139920 A1   May 22, 2014

Related U.S. Application Data

(62) Division of application No. 12/780,920, filed on May 16, 2010.

(30) Foreign Application Priority Data

Dec. 2, 2009   (CN) .................. 2009 1 03107620

(51) Int. Cl.
| | | |
|---|---|---|
| *G02B 5/30* | (2006.01) | |
| *G02B 27/28* | (2006.01) | |
| *B82Y 10/00* | (2011.01) | |
| *B82Y 30/00* | (2011.01) | |

(52) U.S. Cl.
CPC ............ *G02B 5/3033* (2013.01); *G02B 5/3058* (2013.01); *G02B 27/286* (2013.01); *B82Y 10/00* (2013.01); *B82Y 30/00* (2013.01); *Y10S 359/90* (2013.01); *Y10S 977/742* (2013.01); *Y10S 977/748* (2013.01); *Y10S 977/834* (2013.01); *Y10S 977/842* (2013.01); *Y10S 977/847* (2013.01); *Y10S 977/901* (2013.01); *Y10S 977/95* (2013.01)
USPC .................. 359/487.06; 359/900; 427/163.1; 977/742; 977/748; 977/834; 977/842; 977/847; 977/901; 977/950; 156/272.2

(58) Field of Classification Search
CPC .. G02B 5/3025; G02B 5/3033; G02B 5/3058; G02B 27/286; B82Y 10/00; B82Y 30/00
USPC ............. 359/487.05, 487.06, 900; 427/163.1, 427/164, 167, 168, 169; 977/742, 748, 834, 977/842, 847, 890, 901, 950; 156/272.2
See application file for complete search history.

(56) References Cited

U.S. PATENT DOCUMENTS

| | | | | |
|---|---|---|---|---|
| 4,217,160 A | * | 8/1980 | Perregaux | .................... 156/239 |
| 7,054,064 B2 | * | 5/2006 | Jiang et al. | ............... 359/485.05 |

(Continued)

FOREIGN PATENT DOCUMENTS

| | | |
|---|---|---|
| EP | 1230448 B1 | 8/2006 |
| JP | 2005-97003 A | 4/2005 |

(Continued)

*Primary Examiner* — Ricky D Shafer
(74) *Attorney, Agent, or Firm* — Novak Druce Connolly Bove + Quigg LLP

(57) ABSTRACT

A polarizer includes a substrate, a carbon nanotube film, and a number of metal particles. The carbon nanotube film is located over the substrate and includes a number of carbon nanotube yarns, each of which comprises a number of substantially parallelly bundled carbon nanotubes. The metal particles are adhered to the carbon nanotubes of the carbon nanotube film.

14 Claims, 4 Drawing Sheets

(56) References Cited

U.S. PATENT DOCUMENTS

| | | | |
|---|---|---|---|
| 7,710,649 B2* | 5/2010 | Feng et al. | 359/489.2 |
| 7,854,991 B2* | 12/2010 | Hata et al. | 428/408 |
| 2006/0014375 A1* | 1/2006 | Ford et al. | 438/622 |
| 2006/0056024 A1* | 3/2006 | Ahn et al. | 359/486 |
| 2006/0279842 A1* | 12/2006 | Kim et al. | 359/487 |
| 2007/0159577 A1* | 7/2007 | Atsushi et al. | 349/96 |
| 2009/0267479 A1* | 10/2009 | Hutchison et al. | 313/309 |
| 2009/0297846 A1* | 12/2009 | Hata et al. | 428/367 |
| 2010/0092784 A1* | 4/2010 | Kamada et al. | 428/426 |
| 2010/0272978 A1* | 10/2010 | Kumar et al. | 428/220 |
| 2012/0247808 A1* | 10/2012 | Lam | 174/126.2 |

FOREIGN PATENT DOCUMENTS

| | | |
|---|---|---|
| JP | 2007-70206 A | 3/2007 |
| TW | 200407567 A | 5/2004 |

\* cited by examiner

POLARIZER AND FABRICATION METHOD THEREOF

This application is a divisional application of patent application Ser. No. 12/780,920 filed on May 16, 2010 from which it claims the benefit of priority under 35 U.S.C. 120. The patent application Ser. No. 12/780,920 claims the benefit of priority under 35 USC 119 from Chinese Patent Application 200910310762.0, filed on Dec. 2, 2009.

BACKGROUND

1. Technical Field

The present disclosure relates to optical components, and especially to a polarizer and a fabrication method thereof.

2. Description of Related Art

Optical polarizers are widely used in devices such as cameras and liquid crystal displays (LCDs) for altering light paths.

A dichroic polarizer is usually fabricated by incorporating dye molecules into polymer chains oriented along one axis. The polymer chains of the dichroic polarizers are usually formed from polyvinyl alcohol (PVA). The dichroic dye molecules are oriented along the same axis as the polymer chains to form dye chains. Accordingly, incident light vibrating parallelly to the dye chains is absorbed by the polarizer, and the incident light vibrating perpendicularly to the dye chains passes through the polarizer. Thus, the polarizer linearly polarizes light.

However, the polarizer made of polymer chains provides poor polarization above 50° C. and in a moist environment. In addition, the method of fabricating the polarizer is quite complicated.

Therefore, it is desirable to provide a polarizer having better reliability and a simpler fabrication method.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present image capture device and control method thereof. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Embodiments of the disclosure will now be described in detail with reference to the accompanying drawings.

Figure 1:
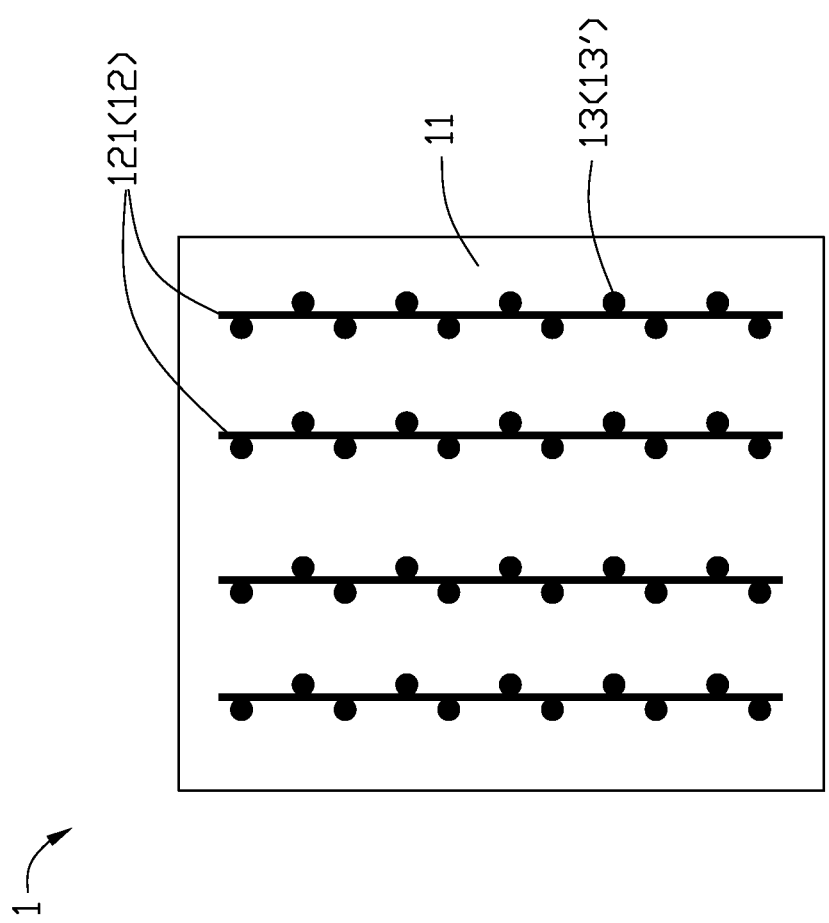
FIG. 1 is a schematic top view of one embodiment of a polarizer.

FIG. 1 shows one embodiment of a polarizer 1. The polarizer 1 includes a substrate 11, a carbon nanotube film 12, and a plurality of particles (hereinafter "deposition particles"), such as metal particles 13 or semi-metallic particles 13'. The carbon nanotube film 12 is located on the substrate 11, and the metal particles 13 or the semi-metallic particles 13' are adhered to the carbon nanotube film 12.

The substrate 11 is a base member of an optical component. The substrate 11 can be, but is not limited to, plastic or light-cured adhesive, such as ultraviolet-curable (UV-curable) adhesive.

The carbon nanotube film 12 includes a plurality of carbon nanotube yarns 121. Each carbon nanotube yarn 121 is made up of a plurality of carbon nanotubes bundled substantially parallelly together. In one embodiment, distances between adjacent carbon nanotube yarns 121 are substantially the same. With such regular arrangement of the carbon nanotube yarns 121, light having a polarization substantially parallel to the carbon nanotube yarns 121 is absorbed, and light having a polarization substantially perpendicular to the carbon nanotube yarns 121 passes through the polarizer 1. Thus, the light passing through the polarizer 1 is polarized. It is noted that the carbon nanotube film 12 and the polarizer 1 will have different polarization effects on light of different wavelengths.

In one embodiment, the metal particles 13 or semi-metallic particles 13' are particles deposited on the carbon nanotubes of the carbon nanotube film 12. A polarization ability of the optical polarizer 1 varies with a composition of the deposited particles and a thickness of layers of the deposited particles on the carbon nanotube film 12. The metal particles 13 can be, but are not limited to, gold, silver, or iron. In one embodiment, the semi-metallic particles 13' are iodine.

Figure 2:
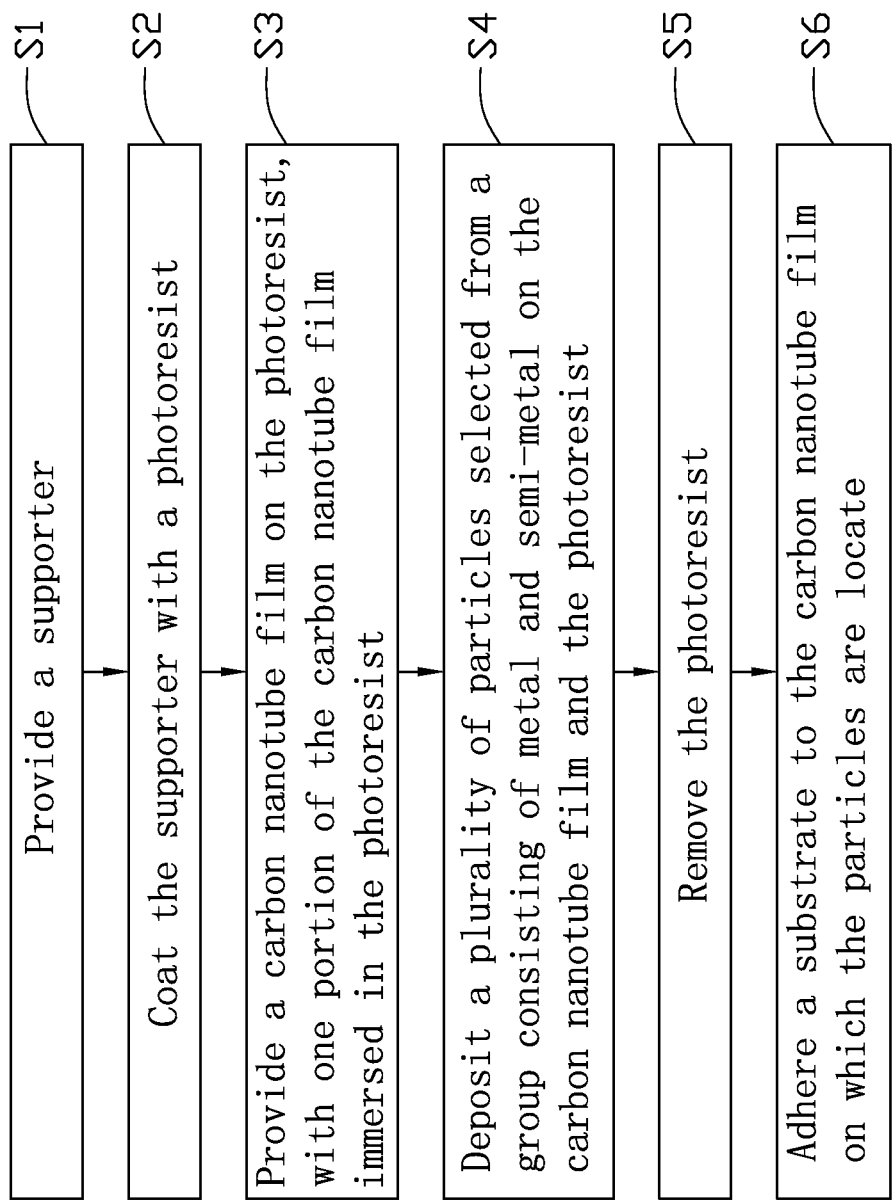
FIG. 2 is a flowchart of an embodiment of a polarizer fabrication method.
Figure 3:
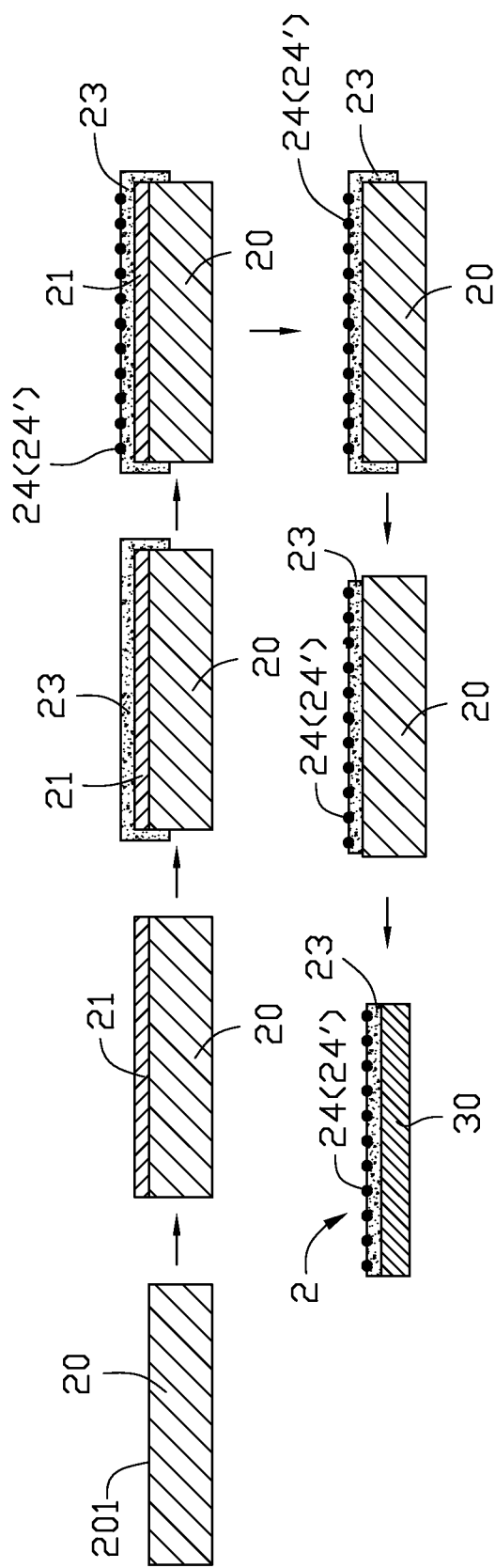
FIG. 3 is a schematic view showing successive stages of the method of FIG. 2.

FIG. 2 and FIG. 3 show one embodiment of a method of fabricating a polarizer 2. In step S1, a support 20 is provided. In step S2, the support 20 is coated with a photoresist 21. In step S3, a carbon nanotube film 23 is placed over the photoresist 21, such that a portion of the carbon nanotube film 23 is submerged in the photoresist 21. In step S4, a plurality of metal particles 24 or semi-metallic particles 24' are deposited on the carbon nanotube film 23 over the photoresist 21. In step S5, the photoresist 21 is removed. In step S6, the carbon nanotube film 23 with the metal particles 24 or semi-metallic particles 24' is adhered to a substrate 30 so as to form the polarizer 2. Steps S1 through S6 are further described in detail as follows.

In Step S1, the support 20 is a substrate having a smooth surface. In one embodiment, the support 20 is a silicon substrate having a smooth surface 201 formed by a polishing process.

In step S2, the smooth surface 201 of the support 20 is coated with the photoresist 21 by a coating process, such as spin coating. In one embodiment, the photoresist 21 is a positive photoresist having a thickness of about 100 micrometers (μm), and softly cured by UV light in a pre-curing process. The photoresist 21 is partially cured by the pre-curing process and maintains a degree of elasticity. The pre-curing process simply changes the photoresist 21 into a solid state. The elasticity of the photoresist 21 can be controlled by an intensity of the UV light.

Figure 4:
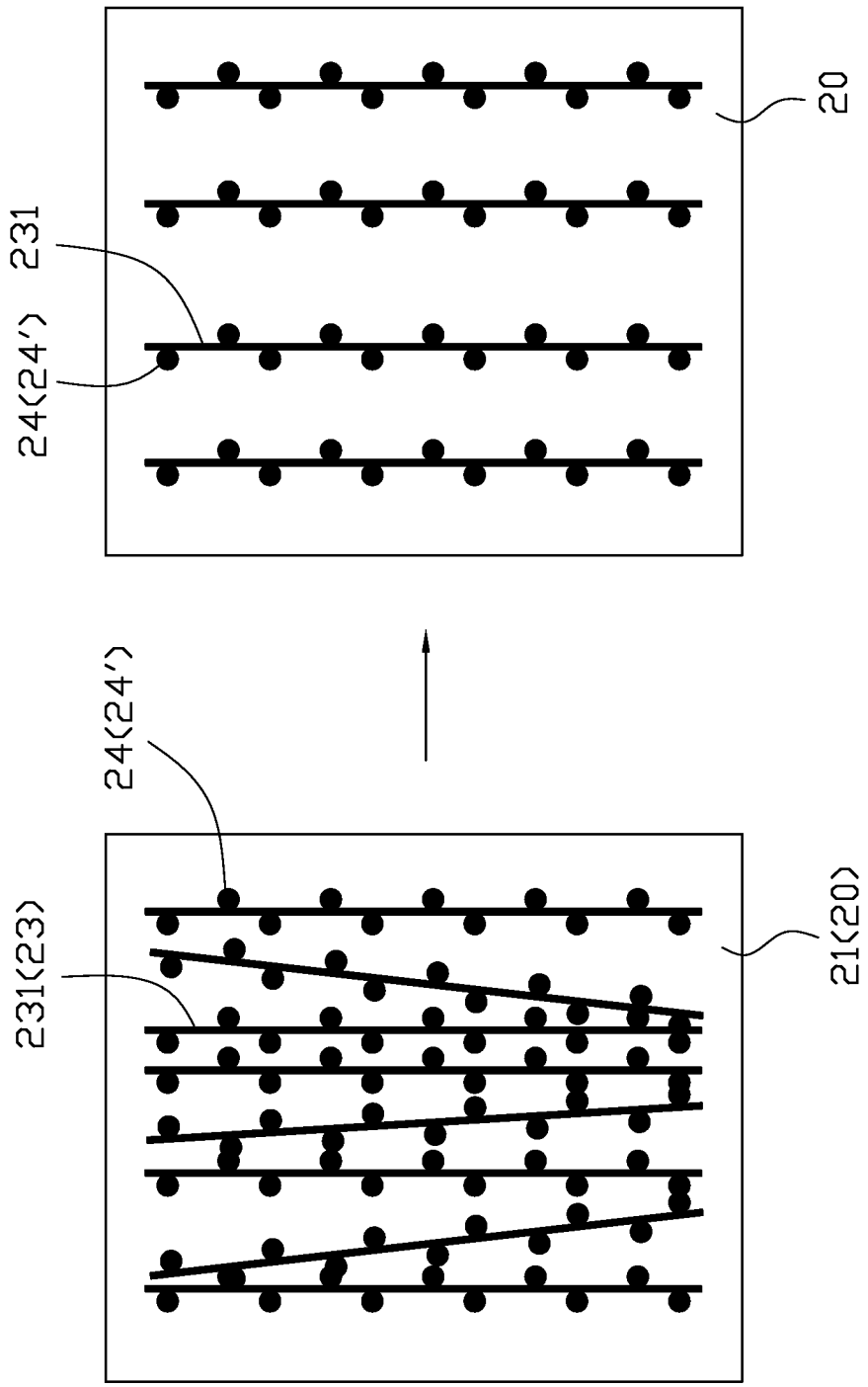
FIG. 4 is a schematic top view illustrating a step of removing carbon nanotubes in the method of FIG. 3.

In step S3, the carbon nanotube film 23 is placed over the photoresist 21. Since the carbon nanotube film 23 is disposed on the partially-cured photoresist 21, a portion of the carbon nanotube film 23 is submerged in the photoresist 21. In one embodiment, the carbon nanotube film 23 is formed by extracting a plurality of carbon nanotubes from a carbon nanotube matrix. Therefore, a plurality of carbon nanotube yarns 121 are formed as shown in FIG. 4, and each carbon nanotube yarn 121 is made up of a plurality of carbon nanotubes bundled substantially parallelly together. Accordingly, the carbon nanotube yarns 231 are substantially parallel to the surface of the carbon nanotube film 23. For each carbon nanotube yarn 231, the carbon nanotubes are connected to each other by van der Waals' forces. Adjacent carbon nanotube yarns 231 might be interconnected through extraneous carbon nanotubes.

In step S4, a type of procedure to deposit the deposition particles on the carbon nanotubes and the photoresist 21 depends on whether the deposition particles are metal particles 24 or semi-metallic particles 24'. The metal particles 24 are deposited by evaporation or sputtering. The deposited metal particles 24 are located on surfaces of the carbon nanotubes above the photoresist 21.

The semi-metallic particles are deposited on the carbon nanotubes and the photoresist 21 by submerging the photoresist 21, the carbon nanotube film 23, and the support 20 in a semi-metallic solution, such as an iodine solution. Thus, the semi-metallic particles 24' are deposited on the surfaces of the carbon nanotube film 23 above the photoresist 21.

A type of deposition particles used depends on a product design, and affects the polarization ability of the optical polarizer 1. As a result, materials used for making the metal particles 24 or the semi-metallic particles 24' can be selected according to required wavelength ranges.

In step S5, the photoresist 21 is removed by a developer solution. Thus, the carbon nanotube film 23 and the deposition particles remain on the support 20.

Referring to FIG. 4, the carbon nanotubes interconnected between adjacent carbon nanotube yarns 231 can be optionally removed. The carbon nanotubes are removed by laser, knife, diamond wheel, or other cutting tool. Regular cutting renders the carbon nanotube yarns 121 spaced substantially equidistantly apart with carbon nanotubes remaining in the carbon nanotube film 23 regularly arranged. In another embodiment, a protective film (not shown) is provided before the carbon nanotubes are removed. The protective film enhances a structural strength of the carbon nanotube film 23 by protecting the carbon nanotube film 23 during cutting.

Step S6 includes coating the carbon nanotube film 23 with a UV-curable adhesive after the photoresist 21 is removed. Thus, the carbon nanotube film 23 is covered by the UV-curable adhesive. The UV-curable adhesive is cured, and the support 20 is removed. Thus, the cured UV-curable adhesive forms the substrate 30, and the polarizer 2 is obtained.

In another embodiment, step S6 includes adhering the carbon nanotube film 23 with the deposition particles to a plastic plate, and then removing the support 20. In this case, the plastic plate forms the substrate 30 of the polarizer 2.

In summary, the polarizer 2 of the present disclosure includes a plurality of carbon nanotubes regularly arranged for polarizing light, and the metal or semi-metallic particles enhance the polarization ability of the polarizer 2. In addition, the method of fabricating the polarizer 2 is simple, which reduces a manufacturing cost.

It is to be understood, however, that even though numerous characteristics and advantages of various embodiments have been set forth in the foregoing description, together with details of the structures and functions of the embodiments, the disclosure is illustrative only; and that changes may be made in detail, especially in matters of arrangement of parts within the principles of the invention to the full extent indicated by the broad general meaning of the terms in which the appended claims are expressed.

What is claimed is:

1. A method for forming a polarizer, comprising:
providing a support;
coating the support with a photoresist;
providing a carbon nanotube film on the photoresist;
depositing a plurality of metal or semi-metallic particles on the carbon nanotube film and the photoresist;
removing the photoresist; and
adhering the carbon nanotube film with the particles to a substrate to form the polarizer;
wherein adhering the carbon nanotube film with the particles to the substrate comprises:
coating the carbon nanotube film with a UV-curable adhesive;
curing the UV-curable adhesive so that the carbon nanotube film is fixed thereto; and
removing the support.

2. The method of claim 1, wherein the support is a silicon substrate.

3. The method of claim 1, wherein the photoresist is a positive photoresist.

4. The method of claim 1, wherein the particles are metal, and the particles are deposited on the carbon nanotube film and the photoresist by evaporation or sputtering.

5. The method of claim 1, wherein the particles are the semi-metallic, and the particles are deposited on the carbon nanotube film and the photoresist by submerging the photoresist, the carbon nanotube film and the support in a semi-metallic solution.

6. The method of claim 5, wherein the semi-metallic solution is an iodine solution.

7. The method of claim 1, wherein the particles are comprised of a material selected from the group consisting of gold, silver, and iron.

8. A method for forming a polarizer, comprising:
providing a support;
coating the support with a photoresist;
providing a carbon nanotube film on the photoresist;
depositing a plurality of metal or semi-metallic particles on the carbon nanotube film and the photoresist;
removing the photoresist; and
adhering the carbon nanotube film with the particles to a substrate to form the polarizer;
wherein adhering the carbon nanotube film with the particles to the substrate comprises:
adhering the carbon nanotube film with the particles to a plastic plate; and
removing the support.

9. The method of claim 8, wherein the support is a silicon substrate.

10. The method of claim 8, wherein the photoresist is a positive photoresist.

11. The method of claim 8, wherein the particles are metal, and the particles are deposited on the carbon nanotube film and the photoresist by evaporation or sputtering.

12. The method of claim 8, wherein the particles are the semi-metallic, and the particles are deposited on the carbon nanotube film and the photoresist by submerging the photoresist, the carbon nanotube film and the support in a semi-metallic solution.

13. The method of claim 12, wherein the semi-metallic solution is an iodine solution.

14. The method of claim 8, wherein the particles are comprised of a material selected from the group consisting of gold, silver, and iron.

* * * * *